(No Model.) 5 Sheets—Sheet 1.
H. FLOYD & W. H. DOUTY.
BLOCK SIGNALING SYSTEM AND APPARATUS FOR RAILWAYS.
No. 490,192. Patented Jan. 17, 1893.
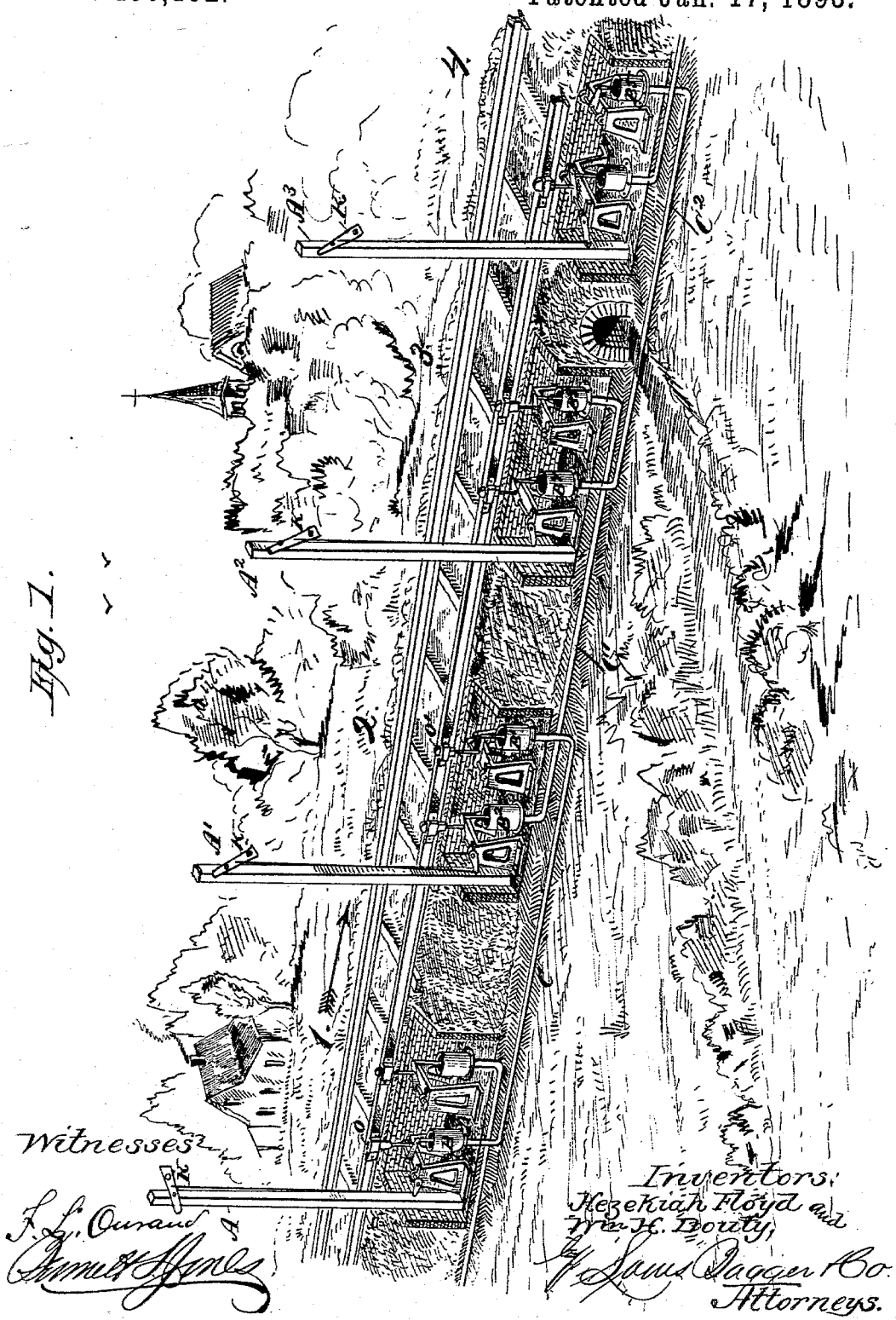

(No Model.) 5 Sheets—Sheet 2.
H. FLOYD & W. H. DOUTY.
BLOCK SIGNALING SYSTEM AND APPARATUS FOR RAILWAYS.
No. 490,192. Patented Jan. 17, 1893.
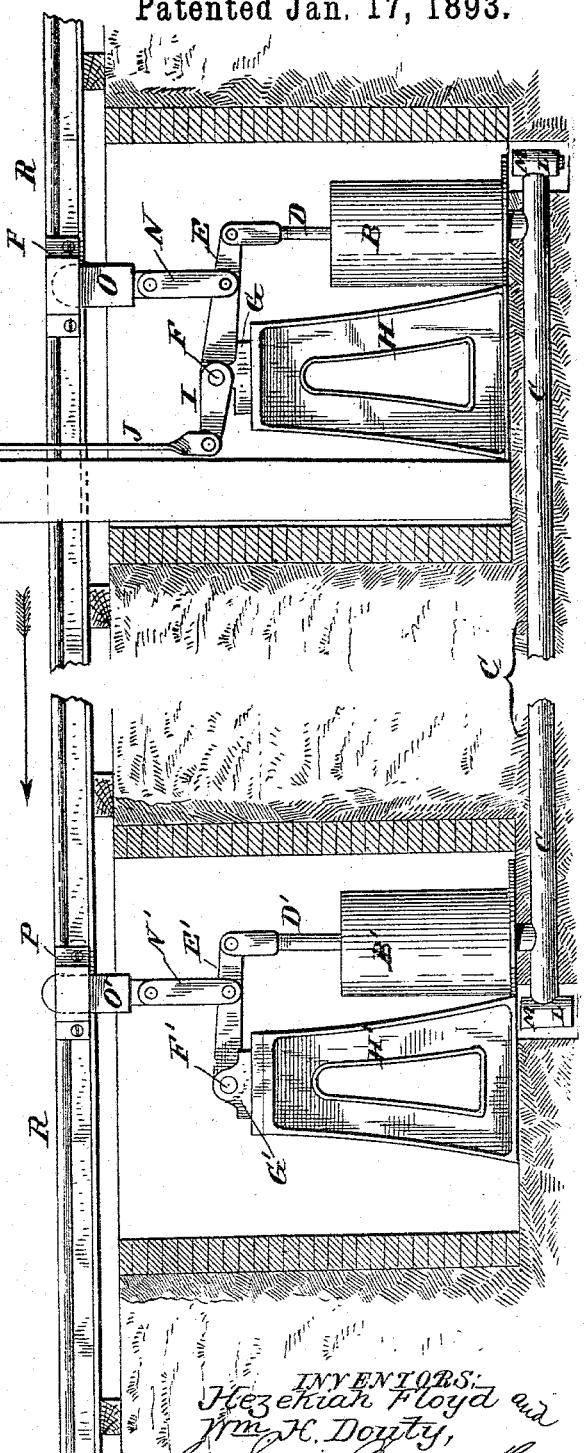
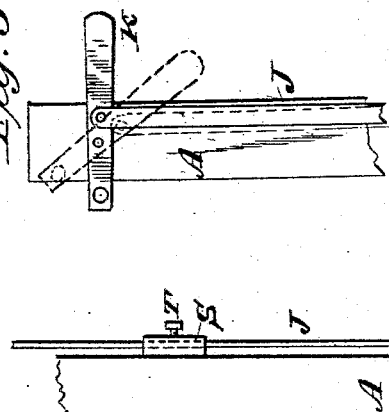
WITNESSES:
F. L. Ourand
Emmett H. Jones
INVENTORS:
Hezekiah Floyd and
Wm. H. Douty,
By Louis Bagger & Co
Attorneys
THE NORRIS PETERS CO., PHOTO-LITHO., WASHINGTON, D.C.

(No Model.) 5 Sheets—Sheet 3.
H. FLOYD & W. H. DOUTY.
BLOCK SIGNALING SYSTEM AND APPARATUS FOR RAILWAYS.
No. 490,192. Patented Jan. 17, 1893.
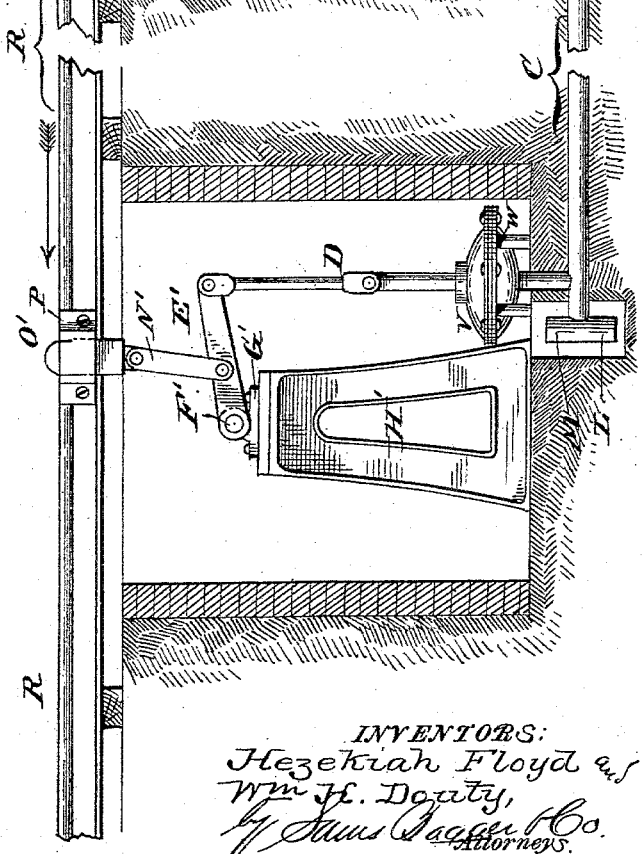
WITNESSES:
F. L. Ourand
Emmett Jones
INVENTORS:
Hezekiah Floyd
Wm. H. Douty,
By James Sagger & Co.
Attorneys.

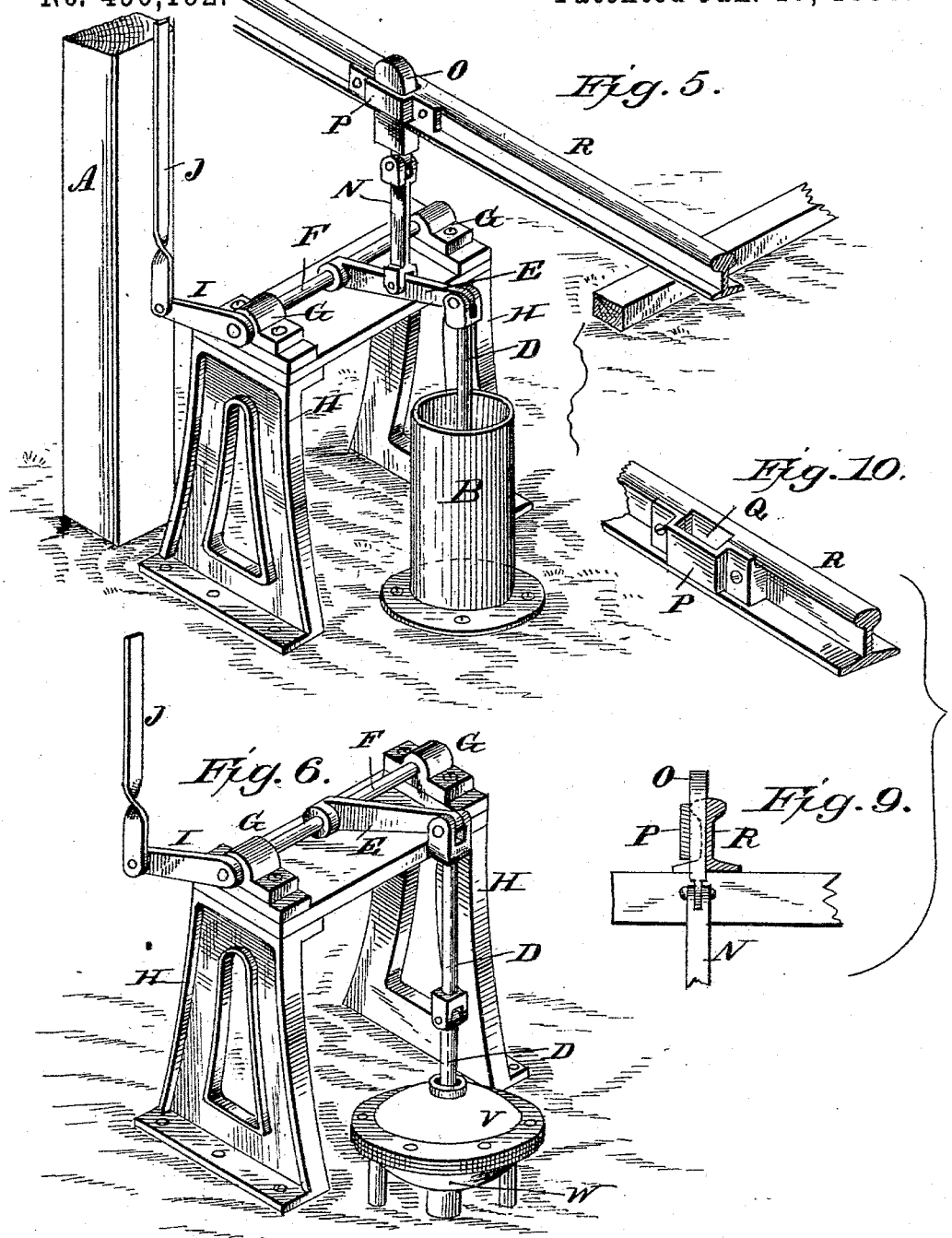

(No Model.) 5 Sheets—Sheet 5.
H. FLOYD & W. H. DOUTY.
BLOCK SIGNALING SYSTEM AND APPARATUS FOR RAILWAYS.
No. 490,192. Patented Jan. 17, 1893.
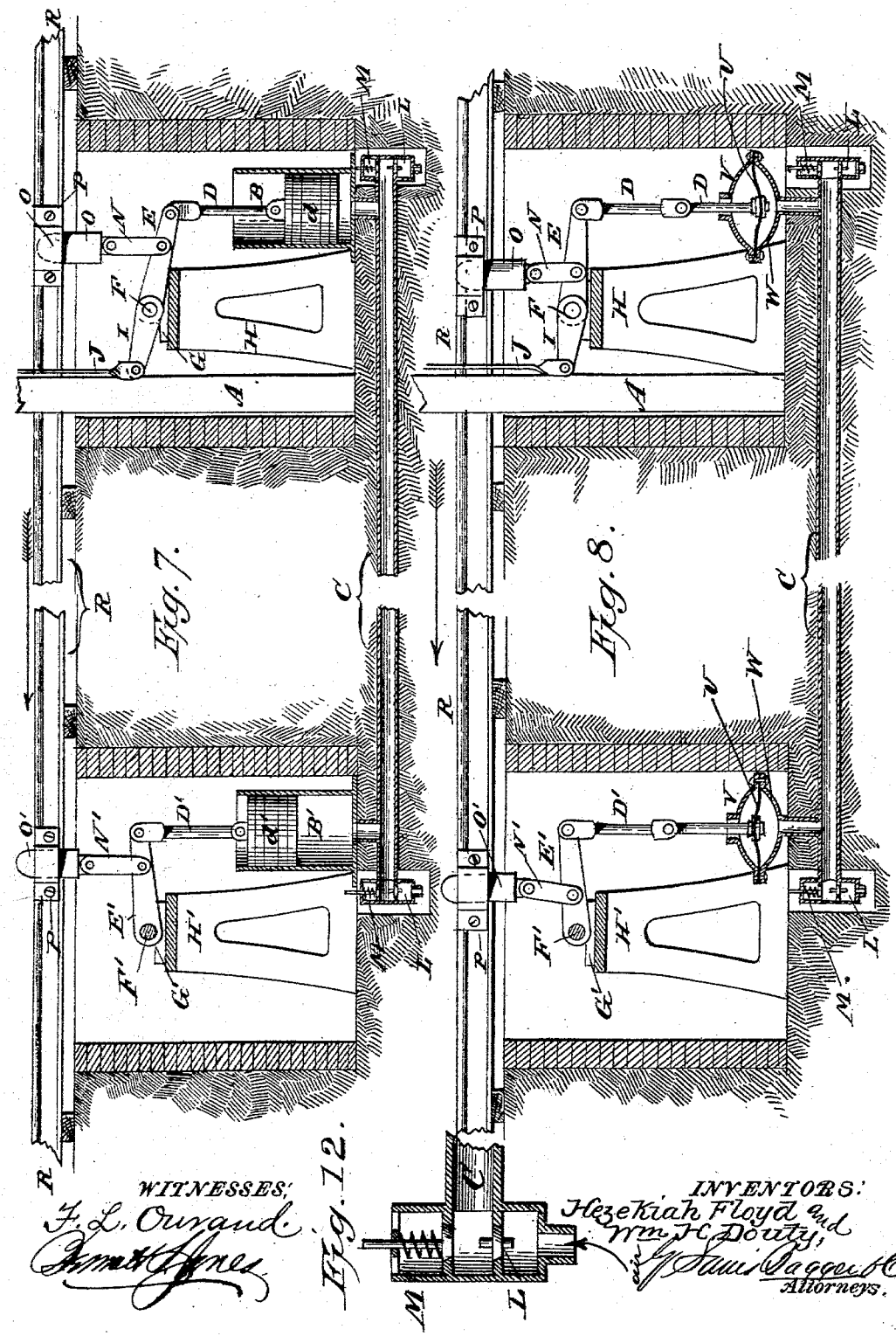
WITNESSES:
INVENTORS:
Hezekiah Floyd and
Wm. H. Douty,
Attorneys.

UNITED STATES PATENT OFFICE.

HEZEKIAH FLOYD AND WILLIAM H. DOUTY, OF SHAMOKIN, PENNSYLVANIA, ASSIGNORS OF ONE-THIRD TO JAMES M. GASKINS, OF SAME PLACE.

BLOCK SIGNALING SYSTEM AND APPARATUS FOR RAILWAYS.

SPECIFICATION forming part of Letters Patent No. 490,192, dated January 17, 1893.

Application filed June 29, 1892. Serial No. 438,447. (No model.)

*To all whom it may concern:*

Be it known that we, HEZEKIAH FLOYD and WILLIAM H. DOUTY, both residents of Shamokin, in the county of Northumberland and State of Pennsylvania, have invented certain new and useful Improvements in Block Signaling Systems and Apparatus for Railways; and we do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of a railway equipped with our pneumatic signaling apparatus; the signal-posts or "stations" being, for convenience in the representation of our system, brought close together and the proportions of the apparatus exaggerated; Fig. 2 is a side elevation of a single pair of the co-operating air-pumps which appertain to each "block" or section of railway, showing also one of the signal posts or stations; Fig. 3 is a detail view of the upper end of one of the signal-posts; the signal being shown in its "set" or displayed position in full line, and dropped or released in dotted lines; Fig. 4 is a side elevation of a single pair of co-operating pumps, but showing a modified construction of the same; their operation, however, being the same as the pumps shown in Fig. 2; Fig. 5 is a perspective view of the pneumatic apparatus shown in Fig. 2; Fig. 6 is a perspective view of the pneumatic apparatus shown in Fig. 4; Fig. 7 is a sectional view, on a vertical plane, through the pair of pumps shown in Fig. 2; Fig. 8 is a sectional view, on a vertical plane, through the pair of pumps shown in Fig. 4; Fig. 9 is a transverse sectional view through one of the rails and its appropriate guide-plate and "shoe" for automatically operating the pneumatic device connected therewith; Fig. 10 is a perspective view of the recessed part of the rail with its guide-plate or "keeper," but with the "shoe" removed; Fig. 11 is a transverse sectional view through one of the signal-posts, showing the friction-keeper or box for maintaining the signal in its "set" or displayed position; and Fig. 12 is a sectional detail view of the air-valve and equalizing-valve appertaining to each air-pump.

Like letters and numerals of reference denote corresponding parts in all the figures.

Our invention relates to that type of signaling systems, and the apparatus therefor, which is known among railroad-men as "block-signaling," or the "block-system;" that is to say: a system of visual signals which give notice to the engineer of an approaching train whether the next "block" or section of road which the train is to pass over is unobstructed and "clear," or is occupied by another train; the understanding under this system of signaling being always that the train approaching a "block" from either direction is not to enter the same until the track is clear throughout the entire length of the block. In order to make such a system thoroughly efficient and reliable, it is not enough that it shall be automatic in its operation, but the devices and mechanism employed to effect this automatic operation must be very strong and durable, so as to be able to stand the wear, tear, and rough usage to which all railroad appliances are more or less subject; and, moreover, the apparatus must be so constructed and arranged that it cannot be made inoperative and useless by the accumulation of snow and dirt. In other words, there must, in a practical and successful apparatus of this type, be no delicate or complicated parts which are liable to break, or to be choked up by snow and ice in the winter, and by dirt and cinders in summer, which would render the entire mechanism inoperative and useless; indeed, worse than useless, as the failure of a signaling apparatus to work properly and efficiently at a given time is fraught with danger and may result in serious accidents.

Now, the object of our invention is to overcome all such drawbacks, and to construct a system of block-signaling, the apparatus and mechanism of which shall work safely and with absolute certainty at all times and seasons. To this end, we have devised a pneumatic system involving the use of air-pumps arranged and operating in pairs, said pumps being actuated successively by passing trains and operating the signals with which they are connected, as will be hereinafter more fully described and particularly pointed out in the claims.

A glance at Fig. 1 of the drawings will convey a general idea of the arrangement of these pumps, which, with their connections, constitute our pneumatic apparatus for working the signals. On that drawing three complete "blocks" of road are shown, and part of a fourth, designated by the numerals 1, 2, 3, and 4. The signal-posts or "stations," separating the blocks from one another, are marked with the reference letters A, A', A² and A³. It will be observed at once that the "blocks" are far too short, and that the size of the pneumatic apparatus is greatly exaggerated; but as this is not a drawing to scale, or in any sense a working drawing, but intended merely to illustrate the arrangement of the pneumatic apparatus relative to the railway and its "block" stations, these disproportions are of no importance.

Referring to the drawing under consideration, it will be seen that the road-bed or embankment is excavated in proximity to each of the signal-posts, so as to form underground pits, which are built up with masonry or timber to form chambers within which the pneumatic apparatus is located. On the drawing we have, for convenience, shown both of the air-pumps appertaining to a single post or station located in a common chamber, and all on the same side of the road; but, in practice, it may sometimes be found expedient to locate one set of pumps on one side, and the other on the opposite side of the road. The location of the pumps in this respect, however, does not in any manner affect or change their operation, and will be solely a matter of choice, convenience and expediency in a given case. These pumps are arranged in pairs, the pumps of each pair being connected by an underground air-pipe. Thus it will be seen that the pumps marked B and B' form a pair, connected by the air-pipe C; B² and B³ form another pair connected by the air-pipe C'; B⁴ and B⁵ form yet another pair, connected by the air-pipe C²; and so on throughout the entire line of road; the air-pipes appertaining to each pair overlapping each other at each post or signal station. In other words: one pump (B²) is located between the two pumps (B and B') of a co-operating pair; another (B⁴) is similarly located between the two pumps (B² and B³) of the next pair: and this arrangement is continued throughout the entire length of road. Thus we build up a system comprising a series of pumps arranged in pairs which overlap one another, or, so to speak, "break joints," the result of which is that one of the intermediate pumps, or a pump located between the two pumps of a working pair, will be reached by a train passing on the track overhead before it reaches the other pump of the pair in the direction of which the train is moving. It is this arrangement which constitutes our "system," and as the construction and operation of each pair of pumps is precisely the same throughout the entire system, a description of one pair will suffice for all.

Referring now to Figs. 2, 5 and 7, showing the working pair of pumps B and B' on a larger scale, it will be seen that the piston-rod D of pump B is articulated at its upper end to the outer end of a crank E, which is fastened upon and projects at right angles from a rock-shaft F, journaled in bearings, G G, which are bedded upon opposite ends of the supporting frame H. Similarly, the other pump B' of this pair has its piston-rod D' articulated to a crank E' of a rock-shaft F', which rocks in bearings G' G' on the stationary supporting frame H'. There is this difference, however, that the rock-shaft F of pump B has an additional arm or crank, I, fastened to its outer end and projecting in a direction opposite to that of crank E, so that when the latter, actuated by the piston and piston-rod, is depressed, the free end of crank I will move in an upward direction, and vice-versa. To the outer end of crank I is articulated the lower end of a rod, J, which passes up alongside of the signal-post A and is connected at its upper end to the semaphore K, in such manner that when rod J is pushed upward, the signal or semaphore K will be presented at right angles to the post, i. e, "set" or displayed, as shown in full line in Fig. 3, while when rod J is pulled, by its connecting arm or crank I, in a downward direction, the signal K will be "released" and dropped, as indicated in dotted lines in Fig. 3.

The pumps B and B' are, as we have seen, connected to form a working pair by the air pipe C, which is extended or prolonged at opposite ends so as to connect the pump-cylinders, at each end, with a pair of valves, one of which, L, is an air-feed valve, while the other, M, is an equalizing-valve, operating to equalize the air-pressure within the pump-cylinder. These valves are shown on an enlarged scale in the detail view, Fig. 12. On the up-stroke of the pump-piston, valve L will open so as to admit air into the cylinder and pipe C, while on the down-stroke, this valve will close. The other valve, M, will always remain closed until the pressure within the pump shall have reached a certain point, when it will open by the air-pressure from within overcoming the spring pressure or weight which keeps it normally closed. As both the equalizing or compensating valves M appertaining to a pair of pumps are adjusted alike, i. e, will open at the same pressure, the air-pressure within both the cylinders of a pair of pumps will always be equalized or balanced, causing a uniform air-pressure within the air chambers of the pump cylinders and their connecting pipe C.

The piston of each pump is connected by its arm or crank E (E') and a connecting rod, N, to a vertically sliding steel block or "shoe," O, which slides vertically in a recess formed by cutting away a portion of the rail R on one side, (see Figs. 5, 9 and 10) and covering it with a guide-plate or keeper, P, which is also recessed opposite to the recess in the rail. A rectangular chamber, Q, open at top and bottom, is thus formed, for the insertion of the steel shoe O, the upper part or head of which is rounded or beveled, for the double purpose of presenting no sharp or abrupt corners to the wheels, and permitting the wheels of a passing train to easily depress and ride over the top of the shoe, which normally projects with its rounded head above the top or tread of the rail, as shown in Figs. 5 and 9. But when a locomotive with its train of cars reaches a point in the track where one of these shoes is inserted, the shoe will be instantly depressed by the wheel flanges below the tread of the rail, or into the position shown on the right side of Figs. 2, 4, 7, and 8, in all of which figures the train is assumed as going from right to left, or in the direction of the arrow marked on each figure, the moving train having passed the pump B at station A, but not yet reached pump B′ some distance back of, or on the other side of, station A′—the train going from left to right (in the direction of the arrow) in Fig. 1. Now, the moment shoe O is depressed, its appropriate connecting rod N, crank-arm E, piston-rod D and piston $d$ are also depressed, forcing the air contained in the air-chamber of pump B below the piston through pipe C into pump B′, where it forces the piston $d'$ and piston-rod D′ in an upward direction, resulting in the raising of the crank-arm E′ and connecting rod N′, so as to push the shoe O′ appertaining to that pump up above the level of the rail, in position to meet, and be again depressed by, the wheels of the train advancing toward it. When this point is reached by the train, and shoe O′ is depressed, the flow of air in pipe C will be reversed and be sent from cylinder B′ back into pump cylinder B, resulting in again raising the piston of said cylinder and thereby re-set shoe O, with its head projecting above the rail, in position to meet and be actuated by the next train. But we have seen that the mechanism appertaining to this pump B involves a crank, I, which is connected with the signal K so as to display it each time the crank arm I is raised. This takes place, as we have also just seen, every time a train passes over pump B and its shoe O, so that the signal indicating that the track is blocked will be displayed the moment the train, passing the signal-station A, enters block No. 1. The signal will remain "set" or displayed until after the train has left block No. 1 and entered block No. 2, where shortly after passing the second signal post A′, it reaches the shoe O′ appropriate to pump B′, thereby reversing the air-pressure in the pump cylinders and pipe C, which results in the depression of the free end of arm I, pulling the signal rod J in a downward direction and releasing and lowering the signal.

In order to maintain the signal K in its displayed position at right angles to the post, after the cars have passed the station and released downward pressure on the shoe O, the connecting rod J is inserted through a guide-box or keeper S, through one side of which is inserted a binding-screw T, which may be so adjusted as to cause its inner end to press or bind against rod J with sufficient pressure to maintain said rod by friction in its pushed-up position, until it is pulled down by the operation of pump B when the train has entered the next block and reached and depressed the shoe O′ appertaining to pump B′. When the train reaches station A′ and enters block No. 2, pump B² will be immediately operated, resulting in the setting of the signal at said post or station A′. Thus both the signals at A and A′ will be displayed, as the signal at A cannot be released until the train has reached pump B′, which is placed some distance back of pump B². This is for the purpose of making allowance for long trains, as it is not desirable to release the signal at post A until the last car of a train has passed out of the block. The same takes place as the train leaving block No. 2 enters on block No. 3; and so on, from block to block, throughout the length of the system. In this manner, the engineer can see at a glance whether the block ahead of him is clear or not, thereby removing one of the most frequent sources of accidents on railways, due to one train running into the rear end of another when both are moving in the same direction, or one standing still and the other moving, on a single track. On double-track roads, the system is made available by simply duplicating it and having one set of signals, and pneumatic apparatus for operating them, for each track.

Instead of using air-pumps of the construction hereinbefore described, another form may be substituted, as illustrated in Figs. 4, 6, and 8. The pump therein shown is a so-called diaphragm-pump, in which a flexible diaphragm, U, takes the place of the reciprocating piston. Instead of a cylinder, the pump-body or chamber consists of an oval chamber (i.e. oval in cross-section) of circular form, composed of two flanged shells V, and W; the flexible diphragm U being firmly clamped and packed air-tight between said flanges. The lower end of the piston rod is connected by nuts and washer-plates to the middle of the diaphragm, as shown in the sectional view, Fig. 8, and the space or chamber above the diaphragm communicates with the open air, either by making an opening or air-vent in the upper shell V, or by making its stuffing-box large enough to let the piston-rod D pass through it loosely, with an annular space around it, as shown in Fig. 8. The compartment below the diaphragm, on the other hand, should be air-tight, and is connected by pipe C and its branches with valves L and M, precisely as the cylinder-pumps. The other parts of the apparatus remain unchanged, and by the raising or lowering of the piston-rod, the flexible diaphragm will be correspondingly raised or depressed, so as to alternately draw air into the chamber formed between the lower shell and the diaphragm, or expel it therefrom into the communicating air-pipe C. Thus it will be seen that the operation of this device is precisely the same as that of the cylinder pumps, and it is a mere matter of choice which of these two forms of air-pumps shall have the preference. Where space is an object, the last-described construction may be found preferable, as that form of pump will require less room than the other.

In the foregoing description of our invention, we have described and shown the signals or semaphores as operated by a connecting rod J, articulated at one end to the signal and at the other end to the crank I of the rock-shaft F appertaining to the operating pump. But where this pump is located some distance from the signal post, it may be found advantageous to "set" and release the signal by compressed air through the instrumentality of an air-pipe carried alongside the post up to the signal, and connected to the same by a suitably constructed pneumatic mechanism, which will probably form the subject of another application. Under ordinary circumstances, however, the sliding signal-rod, with its friction arrangement, as illustrated on the drawings, will be found to answer every purpose.

It will be seen that we dispense entirely with the use of springs, weights, and intermeshing gears, for operating the signals; we have no long connecting-rods, sliding in bearings between the stations, for transmitting power and motion from one point to another, and no part of our apparatus can "bind" or become choked up by snow or dirt, so as to render it wholly or in part inoperative. The pipes appertaining to each pair of pumps once having been laid between stations, all the power necessary to operate the signals with absolute certainty and efficiency is supplied by air-pressure, thus avoiding the great loss of power, as well as the wear and tear, which necessarily results from the use of sliding rod-connections between stations; and as the air-pipes and other parts of the pneumatic apparatus are under ground, they cannot be cut or otherwise tampered with by evil-disposed persons, as in the case of connecting-rods and mechanism which works above ground. The movements of all the parts being direct and positive, we have no "lost motion" to contend with, and in turning corners or going up-grade or down-grade, all that is necessary is to bend or deflect the air-pipes connecting the pumps of the system to conform to the curves and elevations; the apparatus working equally well on straight lines and curves; a level track, or a track with frequently shifting grades.

Having thus described our invention, we claim and desire to secure by Letters-Patent of the United States:

1. The combination, with a line of railway and with one another, of the following elements: a shoe or block working vertically in a slot or recess in the rail and projecting with its upper end above the tread of the same; an air-pump suitably located; a connecting rod connecting the lower end of said shoe with the upper end of the piston-rod; an air-pump; feed-valves and equalizing valves connecting said pump with the outer air; and a pipe connecting the two pumps of a pair; substantially as and for the purpose set forth.

2. The combination, in pneumatic signaling apparatus, of a series of air-pumps arranged and connected in pairs, and located along the line of track of the railway, the two pumps of a pair being connected by an air-pipe, and each pump of the pair being provided with a feed-valve and an equalizing-valve for equalizing the air pressure within the connected pumps; substantially as and for the purpose shown and set forth.

3. The combination of the air-pump; the piston and piston-rod of the same; the crank, E, rock-shaft, F, crank, I, connecting rod, J, and semaphore, K; substantially as and for the purpose shown and set forth.

4. The combination of the pump, B, piston-rod, D, crank, E, rock-shaft, F, crank, I, connecting rod, J, signal post, A, friction box, S, and adjusting screw, T; all constructed and combined substantially as and for the purpose herein shown and set forth.

In testimony that we claim the foregoing as our own we have hereunto affixed our signatures in presence of two witnesses.

HEZEKIAH FLOYD.
WILLIAM H. DOUTY.

Witnesses:
AUGUST PETERSON,
ARTHUR B. SEIBOLD.